(12) United States Patent
Appalaraju et al.

(10) Patent No.: US 10,380,339 B1
(45) Date of Patent: *Aug. 13, 2019

(54) REACTIVELY IDENTIFYING SOFTWARE PRODUCTS EXHIBITING ANOMALOUS BEHAVIOR

(71) Applicant: Amazon Technologies, Inc., Seattle, WA (US)

(72) Inventors: Srikar Appalaraju, Bangalore (IN); Amol Wanjari, Bangalore (IN); Amit Arora, Bangalore (IN); Vipul Bhargava, Bengaluru (IN); Ashish Hari Chiplunkar, Bangalore (IN); Vineet Khare, Bangalore (IN); Chellappan Lakshmanan, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,495

(22) Filed: Jun. 1, 2015

(51) Int. Cl.
*G06F 12/14* (2006.01)
*G06F 21/56* (2013.01)

(52) U.S. Cl.
CPC ........ *G06F 21/56* (2013.01); *G06F 2221/033* (2013.01)

(58) Field of Classification Search
CPC combination set(s) only.
See application file for complete search history.

(56) References Cited

U.S. PATENT DOCUMENTS

| | | | |
|---|---|---|---|
| 8,688,491 B1 * | 4/2014 | Shenoy | G06Q 30/02 |
| | | | 705/7.11 |
| 9,219,719 B1 * | 12/2015 | Jagpal | H04L 63/062 |
| 9,432,389 B1 * | 8/2016 | Khalid | H04L 63/1425 |
| 9,591,020 B1 * | 3/2017 | Aziz | G06F 9/45537 |
| 9,773,112 B1 * | 9/2017 | Rathor | G06F 21/56 |
| 10,089,661 B1 * | 10/2018 | Appalaraju | G06Q 30/0282 |
| 2004/0064736 A1 * | 4/2004 | Obrecht | G06F 21/566 |
| | | | 726/24 |
| 2005/0283511 A1 * | 12/2005 | Fan | G06F 11/008 |
| | | | 708/306 |
| 2007/0206741 A1 * | 9/2007 | Tiliks | H04M 3/2281 |
| | | | 379/106.02 |
| 2008/0288430 A1 * | 11/2008 | Friedlander | G06F 16/2462 |
| | | | 706/46 |

(Continued)

*Primary Examiner* — Phy Anh T Vu
(74) *Attorney, Agent, or Firm* — Lee & Hayes, P.C.

(57) ABSTRACT

Techniques are disclosed herein for reactively identifying software products, available from an electronic marketplace, that are exhibiting anomalous behavior. Data associated with software products is accessed and analyzed to determine anomalous behavior. The data analyzed may include, but is not limited to, crash data, ratings data, marketplace data, usage data, and the like. A machine learning mechanism may be used to classify the application into a category relating to whether a potential anomaly is identified for the software product. A score may also be calculated for the software applications that indicates a severity of the anomalous behavior. The classification and/or the score may be used to determine whether to perform further analysis or testing with regard to a software product. For instance, the score may be used to determine that the software product is to be tested by a testing service.

17 Claims, 8 Drawing Sheets

(56) References Cited

U.S. PATENT DOCUMENTS

| | | | | |
|---|---|---|---|---|
| 2011/0119226 A1* | 5/2011 | Ruhl | ............ | G06F 16/958 |
| | | | | 706/52 |
| 2011/0119374 A1* | 5/2011 | Ruhl | ............ | G06Q 10/06 |
| | | | | 709/224 |
| 2013/0227636 A1* | 8/2013 | Bettini | ............ | H04W 4/001 |
| | | | | 726/1 |
| 2013/0287256 A1* | 10/2013 | Narasimha | ............ | G06K 9/6201 |
| | | | | 382/103 |
| 2014/0082171 A1* | 3/2014 | Kochut | ............ | H04L 41/00 |
| | | | | 709/223 |
| 2015/0317337 A1* | 11/2015 | Edgar | ............ | G06F 17/30 |
| | | | | 707/751 |
| 2016/0098561 A1* | 4/2016 | Keller | ............ | G06F 21/554 |
| | | | | 726/24 |
| 2017/0177468 A1* | 6/2017 | Thangamani | ............ | G06F 8/65 |
| 2017/0249459 A1* | 8/2017 | Permeh | ............ | G06F 21/54 |
| 2018/0034842 A1* | 2/2018 | Smyth | ............ | G06N 7/005 |

* cited by examiner

REACTIVELY IDENTIFYING SOFTWARE PRODUCTS EXHIBITING ANOMALOUS BEHAVIOR

BACKGROUND

Today, many users acquire software products from electronic marketplaces. The catalog for an electronic marketplace from which customers may choose software products may include a large number of software products that typically increase on a daily basis. Maintaining high quality standards for the software products can be challenging for providers of such electronic marketplaces.

The significant variation in the software and hardware configuration of smartphone, tablet, and other types of computing devices can make it difficult for developers to create software products that execute properly on a wide range of devices. For example, a developer might test the operation of their software products on a single device that they own. It is, however, usually cost prohibitive for a developer to purchase many physical devices to use for testing. A software product that does not execute properly can be frustrating to both the developer and to the customers that acquire the program from an electronic marketplace.

In an attempt to maintain the quality of the software products offered by an electronic marketplace, software products submitted to the electronic marketplace might be tested for various types of issues before the software products are made available to customers. For instance, some or all of the software products may be tested for operational issues. The analysis and testing of these software products, however, may require a significant investment in time and money by the provider of the electronic marketplace.

DETAILED DESCRIPTION

Figure 1:
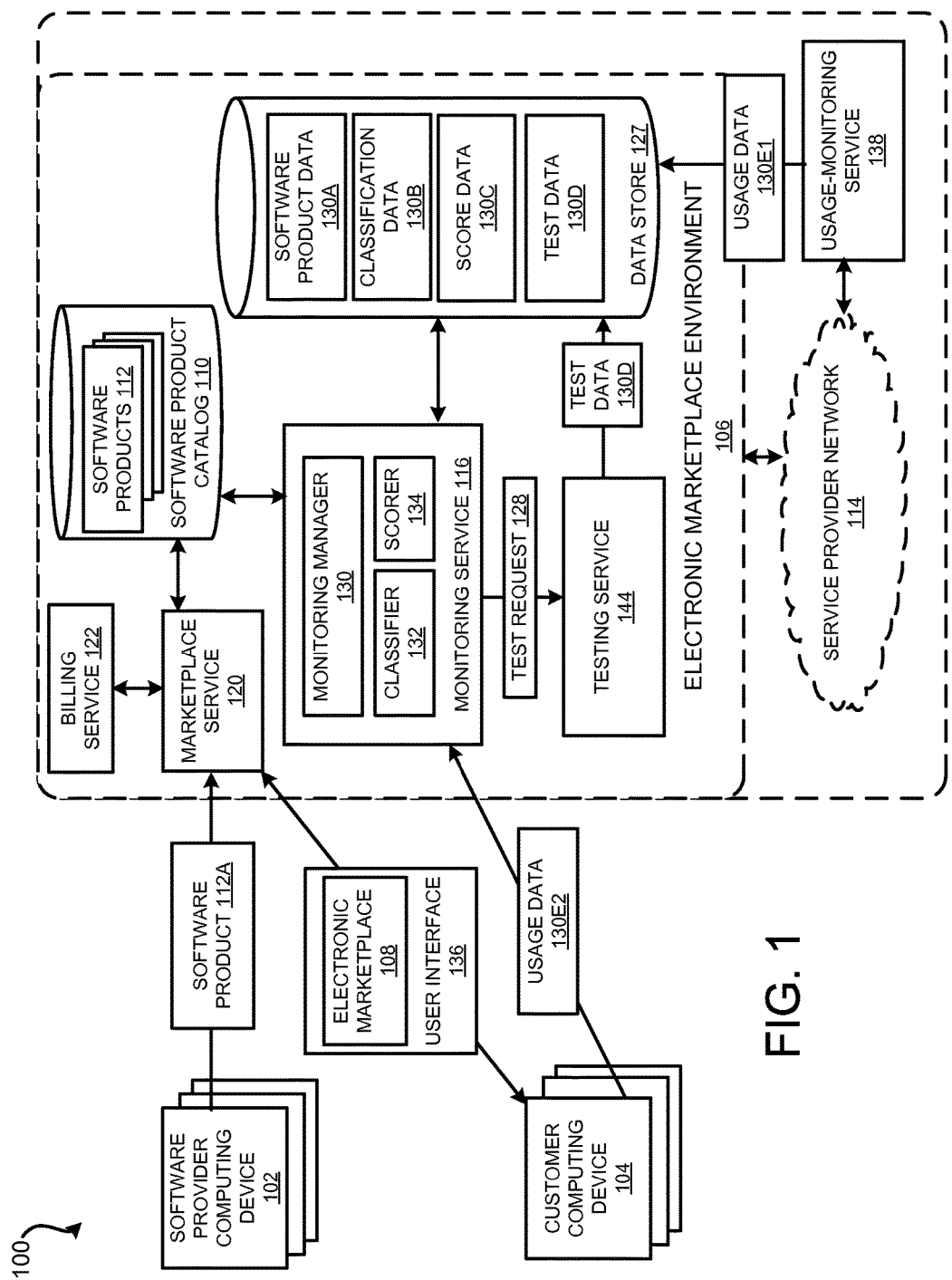
FIG. 1 is a block diagram depicting an illustrative operating environment in which data associated with software products of an electronic marketplace are programmatically analyzed to identify anomalous behavior.

The following detailed description is directed to technologies for identifying software products that may be exhibiting anomalous behavior. Anomalous behavior can include any identified or detected behavior associated with a software product that is not standard, normal, or expected, for example crashing or exhibiting an error. Using the technologies described herein, software products that are available from an electronic marketplace may be identified as exhibiting anomalous behavior by a programmatic analysis of data associated with the software products. In this way, problematic or potentially problematic software products can be identified, for example for further testing, more easily and by reducing or eliminating manual identification. Software product can include any software and/or software services, for example, an application (or "app" on a mobile device), a machine image, or software provided as a service ("SaaS"). In some configurations, the software product may be available from an electronic marketplace and may be downloaded by a customer and executed on a computing device. The software product might also be executed within a service provider network or some other type of distributed computing environment.

Different mechanisms may be used to identify that a software product available from an electronic marketplace may be exhibiting anomalous behavior. For example, and without limitation, a machine learning mechanism, a scoring mechanism, or a classification mechanism might be utilized to reactively identify that a software product available from an electronic marketplace may be exhibiting anomalous behavior. In some configurations, a monitoring service accesses and analyzes data associated with a software product after the software product is already available to customers of an electronic marketplace.

The data accessed and analyzed by the monitoring service might include, but is not limited to, crash data, ratings data, marketplace data, usage data, and the like. The crash data might be data that is obtained from a crash of the software product (e.g., crashed on a customer computing device or within a service provider network). The ratings data might include positive or negative reviews of a software product or software provider. The usage data may include data related to a use of the software product. For example, the usage data might include data indicating how the software product is being utilized on a customer computing device or within a service provider network. The marketplace data might include data such as revenue data for the software product, number of downloads of the software product, and the like. Generally, any data that provides an indication of a current state of the software product may be accessed and utilized by the monitoring service to identify anomalous behavior.

After accessing the data, the data is programmatically analyzed to detect behavior associated with the software product that may be considered anomalous behavior. In some configurations, a machine learning mechanism may utilize the accessed data to identify whether a software product available from an electronic marketplace is exhibiting anomalous behavior. According to some examples, the monitoring service may classify the software products into different categories that provide an indication of anomalous behavior. For example, the software products may be classified into a non-anomalous behavior category (e.g., a good software product) and an anomalous behavior category (e.g., a bad software product). In some configurations, more classification categories may be utilized when classifying the software products.

According to some examples, the monitoring service may determine a severity of the anomalous behavior. For instance, the monitoring service may generate scores for software products that indicates the severity of the identified anomalous behavior. In some examples, the monitoring service utilizes a statistical mechanism to generate the scores. According to some configurations, the scores may be sorted (e.g., in increasing or decreasing order) in order to determine the software products that are detected as exhibiting the most severe (or least severe) anomalous behavior.

The classification and/or the score might be used to determine what software products available from an electronic marketplace are to be tested or further analyzed. For instance, the monitoring service may cause one or more of the software products identified as exhibiting (or possibly exhibiting) anomalous behavior to a testing service for automated and/or manual testing. In some configurations, the monitoring service determines the software products to test based on the available resources of the testing service. In these cases, the score might be used to prioritize the testing of the software products.

In other examples, the identification that the software product may be exhibiting anomalous behavior may be used to notify the software provider of the issue, remove (temporarily or permanently) the software product from an electronic marketplace, and the like. For instance, the classifications and scores may be software products that are classified as exhibiting anomalous behavior may be excluded from the electronic marketplace until the issue causing the anomalous behavior is addressed.

In some examples, results of the classification and scoring of the software products may be provided to an authorized user. For instance, the classifications and the scores may be displayed within a graphical user interface ("GUI"), or provided in some other manner. In some configurations, the results may be used to further refine the machine learning mechanism. For example, the results from the classification and/or the scores may be used to update a model used by the machine learning mechanism. In some configurations, an authorized user might also use the results to adjust the weight of different parameters used by the classifier and/or scorer (e.g., a number of crashes might be weighted more heavily as compared to a number of times the software product is launched). Additional details regarding the various components and processes described above relating to reactively identifying software products that may be exhibiting anomalous behavior will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which data associated with software products of an electronic marketplace are programmatically analyzed to identify anomalous behavior. As illustrated in FIG. 1, the operating environment 100 includes one or more software provider computing devices 102 and one or more customer computing devices 104 in communication with an electronic marketplace environment 106. The electronic marketplace environment 106 may provide an electronic marketplace 108. In some examples, the electronic marketplace environment 106 may be associated with and/or implemented by resources provided by a service provider network 114.

A software provider, using a software provider-computing device 102, may submit one or more software products 112 to the electronic marketplace 108 for inclusion in an online software product catalog 110. For example, the software products 112 might be applications that are available for download and use on a customer computing device 104, such as applications for use on a tablet or smartphone computing device. Alternately, the software products 112 may be virtual machine images or other types of software components that may be executed on computing resources provided by the service provider network 114.

At some point after submission of the software products 112, the electronic marketplace environment 106 may make the software product 112, as well as other software products 112 submitted to the electronic marketplace 108, available to customers. As used herein, the terms "customer" and "customers" refer to existing customers of the electronic marketplace 108 provided by the electronic marketplace environment 106 and/or the service provider network 114 as well as visitors (i.e. potential customers) to the electronic marketplace 108 and/or the service provider network 114.

A customer, using a customer computing device 104, may access the electronic marketplace 108 to browse and acquire or purchase software products 112 made available by the electronic marketplace environment 106 by the software providers. As used herein, a "purchase" of the software product may result in no payment from a customer (e.g., a free software product), a one-time payment from a customer, or may result in payments from a customer that are made on an ongoing basis depending upon how the software is utilized and executed. In some examples, a purchase of a software product establishes a subscription to the software product that allows the customer to execute the software product at a specified usage fee. The specified usage fee may be based on different factors such as a time the software product is executed, a number or type of resources used by the software, a number of operations performed by the software product, and the like.

After acquiring the software product 112, the customer may configure the software product 112 and launch the software product 112 for execution. In some examples, such as in the case of a tablet or smartphone application, the software product 112 may be downloaded from the electronic marketplace environment 106 and executed on the customer computing device 104. In other examples, the software product 112 executes in a service provider network 114 that is operated, maintained, provided and/or otherwise associated with an the operator of the electronic marketplace 108. In some examples, the service provider network 114 might be operated by a different entity than the entity that operates the electronic marketplace 108.

As described in more detail below, the service provider network 114 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

In the illustrated example, the electronic marketplace 108 is implemented by several computer systems that are interconnected using one or more networks. More specifically, the electronic marketplace 108 may be implemented by a marketplace service 120, the electronic software product catalog 110 including the software products 112, a monitoring service 116, and a billing service 122. Each of these components will be described in more detail below. In this regard, it should be appreciated that the electronic marketplace 108 may be implemented using fewer or more components than are illustrated in FIG. 1. For example, all or a portion of the components illustrated in the electronic marketplace environment 106 may be provided by the service provider network 114 as illustrated by a dashed line around the electronic marketplace environment 106 and the service provider network 114. In addition, the electronic marketplace environment 106 could include various Web services and/or peer-to-peer network configurations. Thus, the depiction of the electronic marketplace environment 106 in FIG. 1 should be taken as illustrative and not limiting to the present disclosure.

The marketplace service 120 facilitates submission of the software products 112 by software providers and browsing and acquisition by customers of software products offered through the electronic marketplace 108. Accordingly, a software provider utilizing a software provider computing device 102 may submit one or more software products 112 to the electronic marketplace 108 via the marketplace service 120. In the current example, the software provider computing device 102 is shown as submitting a software product 112A. The submitted software product 112A may then be included in an electronic software product catalog 110.

The software product catalog 110 is a data store that includes information on software products 112 submitted from different software providers. Accordingly, the marketplace service 120 may obtain software products from software providers and make the software products available to a customer from a single network resource, such as a Web site. In some examples, the software product catalog 110 may include a category designation for the software products 112. For example, the software products 112 that perform the same or similar functionality may have the same category designation.

Illustratively, the marketplace service 120 may generate one or more user interfaces, such as a user interface 136, through which a customer, utilizing the customer computing device 104, or some other computing device, may browse the available software products 112, submit queries for matching software products and view information regarding specific software products available from the electronic marketplace. A customer may purchase a software product 112 from the electronic marketplace 108, configure the software product 112 and launch the software product 112 for execution (e.g., on a customer computing device 104 and/or in the service provider network 114).

The marketplace service 120, or some other computing device, may facilitate the purchase of the software product 112. In this regard, the marketplace service 120 may receive payment information from the customer computing device 104. The marketplace service 120 may also establish an account or update an account for a customer. The account information may include a variety of different information, such as one or more payment methods, billing preferences, address information, communication preferences, privacy preferences, and the like. This information might be obtained by the marketplace service 120 and provided to the billing service 122. The billing service 122 may also be configured to process payments from customers and, in some examples, provide payment to the software providers of the software products 112.

The usage-monitoring service 138 may be configured to monitor a use of the software products 112 that are purchased by customers. For example, the usage-monitoring service 138 may be in communication with the monitoring manager 130 and the service provider network 114 and is operable to monitor usage of the functionality provided by the software product 112. The usage data 130E1-130E2 (which may be referred to herein as "usage data 130E") might include data such as a usage time of the software product 112, a number of virtual machine instances utilized to execute the software product 112 in the service provider network 114, an amount of bandwidth used by the software product 112, a CPU utilization of the software product 112, a memory use of the software product 112, an amount of storage used by the software product 112, other software products 112 or services accessed by the software product 112, or the like. The usage data 130E1 may be associated with a use of the software product 112 in the service provider network 114. The usage data 130E2 may be associated with the use of the software product 112 on another computing device, such as the customer computing device 104. In some examples, the usage data 130E generated by the usage-monitoring service 138 might be used by the monitoring service 116 to detect negative trends in the usage associated with a software product 112. For example, the usage data may indicate user spending less time interacting with the software product 112.

In the example illustrated in FIG. 1, the monitoring service 116 includes a monitoring manager 130, a classifier 132 and a scorer 134. While the monitoring manager 130, the classifier 132 and the scorer 134 are illustrated within the monitoring service 116, all or a portion of these components may be located in other locations. For example, the classifier 132 and the score 134 may be located externally from the monitoring service 116 at some other location in the electronic marketplace environment 106 or the service provider network 114. Similarly, the monitoring manager 130 may be part of the marketplace service 120, and the like.

As discussed in more detail below, the monitoring service 116, utilizing the monitoring manager 130, may identify software products 112 that are or may be exhibiting anomalous behavior. In some examples, the monitoring manager 130 may use the classifier 132 and/or the scorer 134 to identify the software products 112 exhibiting anomalous behavior. The classifier 134 may classify each of the software products 112 within a classification category and the scorer 134 may generate scores for software products 112. A score generated by the scorer 134 may provide an indication of how likely the software product 112A is to violate the IP rights of another software provider. Score data 130C associated with the scores generated by the scorer 134 may be stored in the data store 127 (or some other memory) by monitoring manager 130. The scores and or classifications may be determined by the scorer 134 and/or the classifier 132 may be determined in response to an occurrence of an event and/or in response to an expiration of time (e.g., daily, weekly, monthly).

According to some configurations, the monitoring service 116 may be configured to use one or more machine learning mechanisms and/or statistical mechanisms to reactively identify the software products 112 that may be exhibiting anomalous behavior. For example, a linear regression mechanism may be used by the scorer 134 to generate a score that indicates a severity of the identified anomalous behavior. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized. The linear models may be simple linear models (e.g., a single predictor variable and a single scalar response variable) or may be multiple regression models (e.g., multiple predictors). The models might also be general linear models, heteroscedastic models, generalized linear models (e.g., Poisson regression, logistic regression, or multinomial logistic regression), Bayesian linear regression, quantile regression, and the like.

The classifier 132 may utilize a classification mechanism to classify the software products 112 analyzed by the classifier 132 into a classification category. For example, the classifier 132 may classify a software product 112 into a first category indicating anomalous behavior, or into a second category indicating minor or no anomalous behavior. In other configurations, the classifier may select from more than two categories when classifying a software product. For instance, the classifier 132 might classify an analyzed software product 112 into one of two, three, four, or some other number of categories. The classifications of the software products 112 by the classifier 132 may be stored by the monitoring manager 130 within the data store 127 (or some other memory) as classification data 130B. According to some examples, random forests may be utilized by the classifier 132. Generally, random forests are a learning method for classification that operate by constructing a multitude of decision trees at training time and outputting the class that is the mode of the classes output by individual trees. Unlike single decision trees (e.g., J48) which may to suffer from high variance or high bias (depending on how they are tuned), random forests use averaging to find a natural balance between the two extremes. In some examples, the data used by the random forests included the device models, the number of downloads, rating data, crash data, and the like that are associated with the software products 112.

In some configurations, the monitoring manager 130 in the monitoring service 116 accesses and provides the software product data 130A to the classifier 132 and the scorer 134 to identify the software products 112 that are or may be exhibiting anomalous behavior. The software product data 130A may include data from a variety of data sources. For instance, the software product data 130A might include, but is not limited to, crash data, ratings data, marketplace data, usage data, and the like (See FIG. 2 for more details). In some configurations, at least a portion of the software product data 130A is used to train one or more models utilized by the machine learning mechanism(s).

In some configurations, the classification data 130B and/or score data 130C may be used by the monitoring manager 130 to determine whether further analysis of a software product 112 should be performed. For instance, the monitoring service 116 may cause one or more of the software products identified as exhibiting, or possibly exhibiting, anomalous behavior to a testing service 144 for automated and/or manual testing. As illustrated, the monitoring service 116 transmits a test request 128 to the testing service 144. The test request 128 requests the testing service 144 to perform one or more tests on one or more software products 112. In some configurations, the monitoring service 116 determines the software products 112 to test based on the available resources of the testing service. For example, the monitoring service 116 may submit a test request 128 to test the software products 112 that are included in one category but not test the software products that are included in another category. Similarly, the monitoring service 116 may submit a test request 128 that includes the software products 112 identified as exhibiting anomalous behavior that exceeds some specified threshold (e.g., using the score data 130C).

In other examples, the identification that the software product 112 is exhibiting anomalous behavior may be used by the monitoring service 116 to notify the software provider of the software product 112 of the issue. The identification that the software product 112 is exhibiting anomalous behavior may also be used by the monitoring manager 130 to remove (temporarily or permanently) the software product from the electronic marketplace 108. For instance, the software products that are classified as exhibiting anomalous behavior or have a score indicating anomalous behavior may be excluded from the electronic marketplace until the issue causing the anomalous behavior is addressed.

As briefly discussed above, the identification that a software product 112 may be exhibiting anomalous behavior might be used for a variety of different purposes. For example, the software product 112 may not be included in the software product catalog 110. In other examples, the software product 112A might be submitted to the testing service 144 for further testing and/or analysis. Data from this further testing might be provided back to the monitoring service 116 and used for tuning the machine learning mechanism that may be utilized in some configurations.

The testing service 144 might perform automated and/or manual testing on software products 112. The testing service 144 might include automated tests that test various types of functionality of the software product 112. In addition, or alternatively, a human tester might also perform manual tests or analysis on the software product 112. The tests may be used to determine whether a software product 112 operates as intended on a variety of different hardware devices. The tests may be performed using the testing service 144 on a variety of different computing devices and/or device emulators. For example, the device emulators might emulate the physical hardware of devices, like smartphones or tablet computers, having different hardware and/or software configurations.

Figure 3:
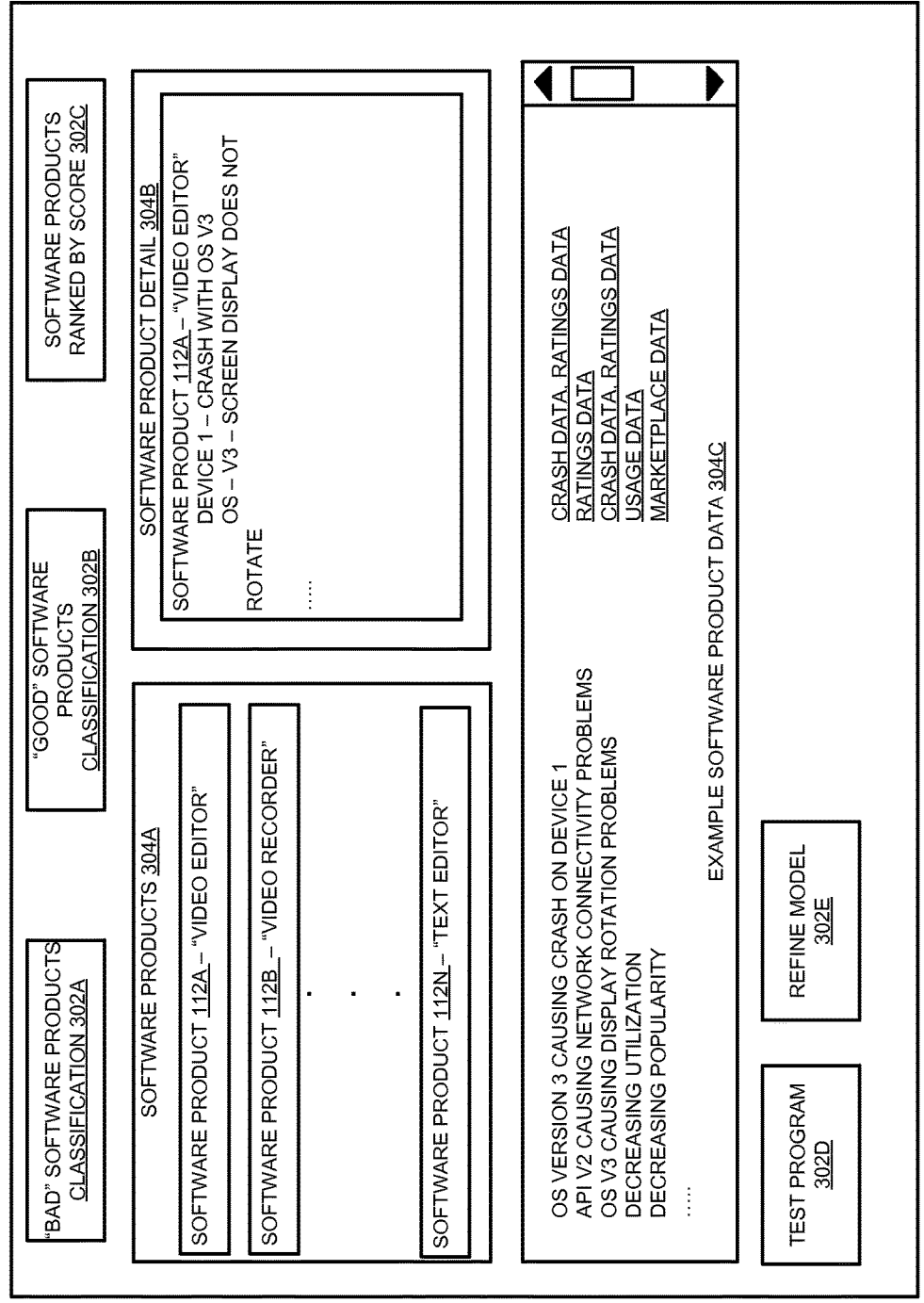
FIG. 3 is a screen diagram showing an interface used to interact with the monitoring service.

In some examples, results of the classification and scoring of the software products may be provided to an authorized user. For instance, the classifications and the scores may be displayed within a graphical user interface (e.g., as illustrated in FIG. 3), or provided in some other manner. In some configurations, the results may be used to further refine the machine learning mechanism. For example, the authorized user might adjust the weight of different parameters used by the classifier and/or scorer (e.g., a number of crashes might be weighted more heavily as compared to a number of times the software product is launched). Adjusting the weighting of different parameters within the machine learning mechanism may cause some parameters to be more influential in reactively identifying the software products 112 that may be exhibiting anomalous behavior.

Figure 2:
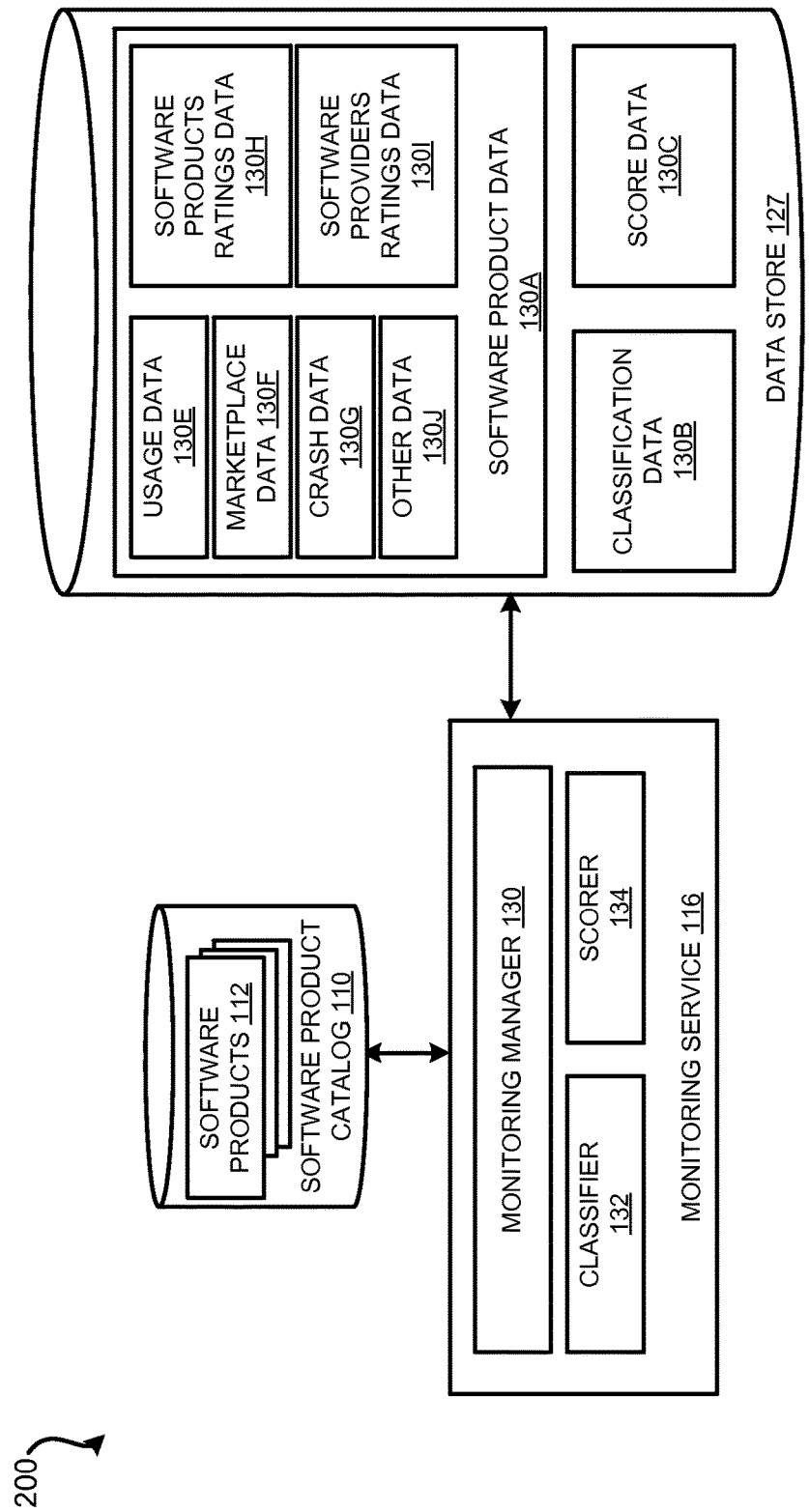
FIG. 2 is a block diagram depicting an illustrative operating environment in which a monitoring service analyzes data associated with software products to reactively identify anomalous behavior.

FIG. 2 is a block diagram depicting an illustrative operating environment 200 in which the monitoring service 116 analyzes data associated with the software products 112 to reactively identify anomalous behavior. As illustrated in FIG. 2, the operating environment 200 includes the monitoring service 116 that may be utilized in identifying software products 112 from the software product catalog 110 that may be exhibiting anomalous behavior.

As discussed above, the monitoring service 116 may utilize a scoring mechanism, such as the scorer 134, and/or a classification mechanism, such as the classifier 132 to reactively identify software products 112 available from an electronic marketplace 108 that are exhibiting anomalous behavior. In some configurations, the monitoring manager 130 in the monitoring service 116 accesses the software product data 130A included in the data store 127. The software product data 130A might include data such as the usage data 130E, marketplace data 130F, crash data 130G, software products ratings data 130H, software providers ratings data 130I, and other data 130J.

Generally, the monitoring service 116 may monitor and/or access software product data 130A indicating software product 112 uninstalls, decreased software product 112 launches, decreased session time for a software product 112, decreased software product 112 usage, decreased revenues for the software product 112, decreased repeat usage of the software product 112, decreased interactions with the software product 112 and the like. According to some configurations, the monitoring service 116 identifies patterns relating to the software products 112. For instance, the monitoring service 116 may identify software product 112 download trends, decreased search queries, decreased software product detail page views, identify reduced purchase intents, and the like. The monitoring service 116 might also identify reimbursement requests made by customers, complaints and the like. For example, an increasing number of uninstalls and/or short session time, for example less than one second, may indicate a potentially anomalous software product 112. Other indicators that may indicate a potentially anomalous software product include but are not limited to crashes, types of crashes, poor applications, a risk associated with the developer (e.g., has the developer had other applications that exhibited anomalous behavior), and the like. As discussed herein, the monitoring service 116 may utilize one or more models and learning mechanisms to identify the patterns relating to the software products 112.

The monitoring service 116 may access one or more data sources to obtain data related to the software products 112 available from the electronic marketplace 108, or some other electronic marketplace. For instance, other software product data associated with other electronic marketplaces stores might be obtained and utilized by the monitoring service 116. Data from search engines, web sites, and the like might also be obtained and utilized by the monitoring service 116. The following are some example types of data that might be utilized by the monitoring service 116 to identify software products 112 that may be exhibiting anomalous behavior.

As described above, the usage data 130E may include data related to a use of a software product 112. For example, the usage data 130E might include data indicating how the software product 112 is being utilized on a customer computing device or within a service provider network. The usage data 130E might indicate how often or how long the software product 112 is utilized, interactions with the software product 112, frequency of installs or uninstalls of the software product 112, and the like.

The marketplace data 130F might include data that provides an indication of a current popularity of software products 112. For instance, the marketplace data 130F may include data that indicates revenue for the software product 112, a number of downloads of the software product 112, a past or current popularity of software products 112, the past or present popularity of software providers, titles of current software products 112, images (e.g., icons or screen captures) of software products 112, and/or other data. The marketplace data 130F might also include a number of downloads of software products, a number of downloads associated with a particular software provider, ratings of software products or software providers, advertising revenue generated by the software products or software providers, and the like.

The crash data 130G might be data that is obtained from a crash (e.g., stops executing) of the software product 112 (e.g., crashed on a customer computing device or within a service provider network). The crash data 130G might be obtained shortly after the crash or at some point in time after the crash. For example, the crash data 130G may be obtained from a dump file that is created at the time the software product crashes. Generally, a dump file provides a snapshot of the software product at the time the crash occurs. The dump file might include information such as, but not limited to, what process was executing, what modules were loaded, what was in memory, and the like.

The software products ratings data 130H may include data related to a review or rating of a software product 112. For instance, the software products ratings data 130H might include positive or negative reviews of a software product. The software providers ratings data 130I may include data related to a review or rating of a software provider. For instance, the software providers ratings data 130I might include positive or negative reviews of a software provider.

The other data 130J might include other data that may be utilized by the monitoring service 116 when reactively identifying the software products 112 that may exhibit anomalous behavior. For example, a data indicating that a software product that is provided by a software provider that does not have a history of providing high quality software products may provide an indication that the software product is more likely to be exhibiting anomalous behavior as compared to a software product provided by an established software provider.

As discussed, the monitoring service 116 programmatically analyzes at least a portion of the software product data 130A to identify behavior of software products that may be considered anomalous behavior. In some examples, the crash data is analyzed to determine what caused the software product to crash.

FIG. 3 is a screen diagram showing an interface used to interact with the monitoring service 116. In the example shown in FIG. 3, the GUI 300 presents an interface that includes UI elements 302A-302F, a software products 304A section, a software products detail 304B section, and an example of software product data 304C section. The GUI 300 might be generated by the monitoring manager 130 as shown in FIG. 1, or some other computing device or component, and presented on a computing device by an application. For example, the application might be a web browser program. The GUI 300 is illustrated for explanation purposes, and is not intended to be limiting. For example, the GUI 300 might include more or fewer UI elements than illustrated in FIG. 3. The UI elements might also be arranged in a different manner than shown in FIG. 3.

The classification UI element 302A and the classification UI element 302B are configured to display the names of the applications 112 that are classified within a particular categorization. As illustrated, the classification UI element 302A, when selected, displays the software products 112 classified as "bad" software products within the software products section 304A. The classification UI element 302B, when selected, displays the software products 112 classified as "good" software products within the software products section 304A. The software products ranked by score 302C UI element is configured to rank the software products 112 according to the determined scores for the software products 112 in response to being selected.

In the current example, a user has selected to view the software products 112 classified as "bad" software products. As illustrated, the software products 304A section includes a display of the software products 112A-112N. The software products 112 included within the listing illustrated in the software products 304A section may or may not be sorted based on the score associated with the software products 112. For example, the software products 112 included in the "bad" software product classification may be displayed within the software products 304A section alphabetically, by score, or by some other filtering parameter. In some examples, selecting the software products ranked by score 302C UI element will sort the display of the software products 112 within the software products 304A section by score.

The software product detail 304B section displays data associated with a selected software product 112. In the current example, a user has selected the "Video Editor" software product 112A displayed within the software products 304A section. In response to receiving the selection, the GUI 300 is updated to display data associated with the selected software product 112 within the software product detail 304B section. As illustrated, the software product detail 304B section shows anomalous behavior identified from the software product data sources 130A.

The example of software product data 304C section displays data associated with anomalous behavior detected or identified by the monitoring service 116 and/or the testing service 144. In the current example, the example of software product data 304C section displays data for the selected software product 112 that is associated with the software product detail 304B section. As illustrated, the example of software product data 304C section includes data indicating that the "Video Editor" software product 112 crashed on device 1 when using version 3 of an operating system. The data also indicates that application programming interface ("API") version 2 is causing network connectivity problems, that OS V3 is causing display rotation problems, and that there is a decreasing utilization and popularity of the software product 112.

Next to the display of the anomalous behavior, the data source from which the information about the anomalous behavior was obtained is displayed. In the current example, the data sources include crash data, ratings data, usage data, and marketplace data. As discussed above, more or fewer data sources may be utilized. In some configurations, the user viewing the GUI 300 might select a link (as indicated by the underlining within the example software product data 304C section to view the data source that provided the software product data 130A.

The test program UI element 302D, when selected, causes one or more of the software products 112 to be tested by the testing service 144. In other examples, when the test program UI element 302D is selected, the testing services of the testing service 144 are provided to the user viewing the GUI 300. For example, the user may select the test program UI element 302D to perform additional testing on one or more of the software products 112A-112N. The refine model element 302E, when selected, provides a mechanism for the user to refine one or more models utilized by the monitoring service 116.

Figure 4:
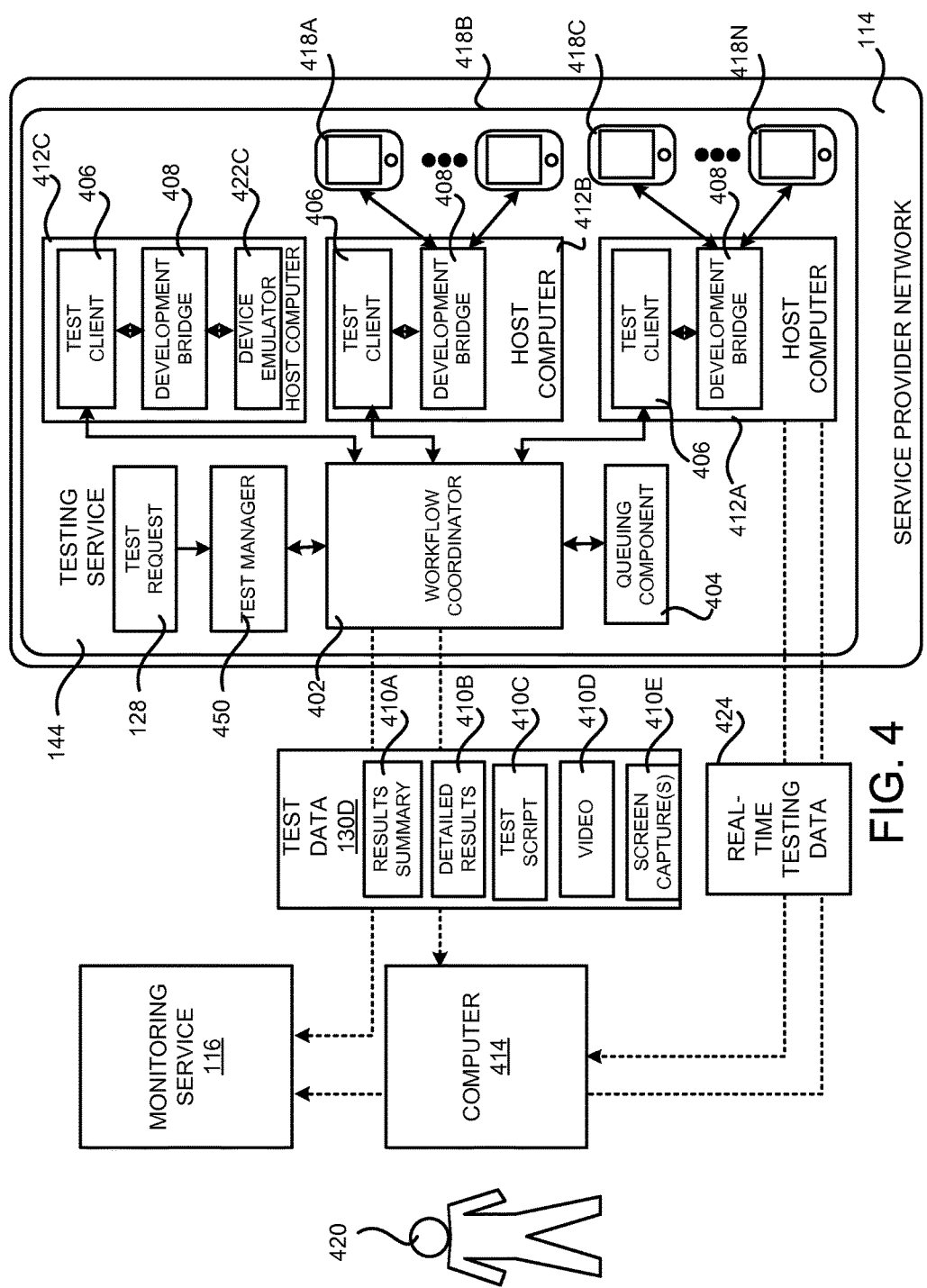
FIG. 4 is a block diagram depicting an illustrative operating environment for testing the operation of a software product and providing test results to a requestor.

FIG. 4 is a block diagram depicting an illustrative operating environment for testing the operation of a software product 112 and providing test results to a requestor. As shown in FIG. 4 and described briefly above, the testing service 144 may provide a network-based service for testing the operation of one or more programs, such as the software products 112. For example, the testing service 144 may be associated with a service provider network 114. As mentioned above, the software products 112 might be submitted to the testing service 144 in a test request 128 by the monitoring service 116 and/or some other user, or in another manner. One illustrative operating environment for testing the operation of a program is described in U.S. patent application Ser. No. 13/875,955, which was filed on May 2, 2013, and entitled "Program Testing Service," and which is expressly incorporated herein by reference in its entirety.

In some examples, a workflow coordinator 402 within the testing service 144 receives the test request 128. As will be described in greater detail herein, the workflow coordinator 402 is a component that is configured to assign test requests 128 to host computers 412A-412C within the testing service 144. The workflow coordinator 402 might also receive test data 130D from the various host computers 412A-412C and provide the test data 130D to the computer 414 that submitted the test request 128, or to some other computing device.

In some examples, the workflow coordinator 402 may be configured to determine whether the test devices, such as the computing devices 418A-418N and/or the device emulators 422, that may be requested in the test request 128 are available for use in testing the software products 112. In other examples, the workflow coordinator 402 may be configured to determine whether the test devices that may be requested by the test manager 450 are available for use in testing the software products 112. When the requested computing devices 418A-418N and/or the device emulators 422 are not available, the workflow coordinator 402 might utilize a queuing component 404 to queue the test request 128 the requested computing devices 418A-418N and/or device emulators 422A-422N become available.

In some implementations, the test of the software products 112 identified by a test request 128 may be queued if one or more of the test devices are unavailable. In other examples, only those test requests 128 that request tests to be performed on unavailable test devices might be queued. Other mechanisms might also be utilized for queuing test requests 128 in other implementations.

If the test devices upon which the test of the software products 112 is to be performed are available, the workflow coordinator 402 may transmit the test request 128 to test clients 406 executing on the host computers 406A-406C. For example, if a test request 128 indicates that the software products 112 are to be tested while executing on a computing device 418A, the workflow coordinator 402 may transmit the test request 128 to the test client 406 executing on the host computer 412. In a similar fashion, if a test request 128 indicates that a test is to be performed using a device emulator 422A, the workflow coordinator 402 may transmit the test request 128 to the test client 406 executing on the host computer 412A.

The test client 406 executing on each of the host computers 412A-412C may be configured to receive test requests 128 from the workflow coordinator 402. According to some examples, the test clients 406 are configured to systematically interact and test the software products 112 for anomalous behavior, as discussed herein. In response to receiving a test request 128, the test client 406 may cause a development bridge 408 to install the software product 112 on the computing device 412 or the device emulator 422 to be tested. According to some configurations, the development bridge 408 provides a mechanism for interacting with a connected computing device 412 or device emulator 422.

In some configurations, the development bridge 408 is the ANDROID Debug Bridge. The ANDROID Debug Bridge may be utilized when the computing devices 418A-418N and/or the device emulators 422A-422N utilize the ANDROID operating system. Other types of bridges might also be utilized when computing devices 418A-418N and/or device emulators 422 configured with other operating systems from other manufacturers are utilized to test the operation of a software product 112.

Once the software product 112 to be tested has been installed on the computing devices 418A-418N and/or device emulators 422 upon which testing should occur, the operation of the software product 112 may be tested using the test manager 450. As described above, the software product 112 may be tested by the test manager 450, the test client 406, or some other component. As discussed above, the testing is configured to test various aspects the operation of the software products 112 on the target computing devices 418A-418N and/or device emulators 422.

According to some examples, the host computers 412A-412C may be configured to transmit real-time testing data 424 to the computer 414, or some other computing device, while the testing of the software products 112 is being performed. For example, in some implementations, the real-time testing data 424 includes text data describing the on-going testing of a software product 112 (e.g., the current event being performed) on a particular computing device 418A-418N or device emulator 422. In other implementations, the real-time testing data 424 may include one or more screen captures 410E, or a video display 410D output generated by one of the computing devices 418A-418N and/or device emulators 422 utilized for testing.

The real time testing data 418 might then be presented on the computer 414 for viewing by an authorized user. In this manner, the user, can view the real time operational testing of the software products 112 on a computing device 418A-418N or device emulator 422. When multiple tests are being performed simultaneously, a mechanism might be utilized at the computer 414 that allows the user 420 to select a computing device 418A-418N and/or device emulator 422A-422N for which the real-time testing data 424 is displayed.

Once the testing of the software products 112 has completed on the computing devices 418A-418N and/or the device emulators 422A-422N, each of the host computers 412A-412C provides test data 130D to the workflow coordinator 402. In turn, the workflow coordinator 402 provides the test data 130D to the monitoring service 116 and/or the computer 414. As shown in FIG. 4, the test data 130D might include a results summary 410A, which indicates whether the tests passed or failed. The test data 130D might also include detailed results 410B that include detailed information regarding the performance of the tests on the computing devices 418A-418N and/or device emulators 422. For example, the detailed results 410B might include log files and/or other detailed results generated by the computing device 418, emulator 422, and/or development bridge 408 during the testing of the software products 112 on the computing devices 418A-418N and/or the device emulators 422. In some examples, the test data 130D includes a test script 410C. The test script 410C might be used by the user 420 to recreate the test and/or view the steps that were part of one or more tests performed by the testing service 144.

In some implementations, the test data 130D also includes screen captures 410E taken on the computing devices 418 and/or the device emulators 422 during the testing of the software products 112. Similarly, the test data 130D might also include video 41D captured from the computing devices 418 and/or the device emulators 422 during all or a portion of the testing of the software products 112. The content of the test data 130D illustrated in FIG. 4 are merely illustrative and that other types of information might be provided in the test data 130D.

Appropriate functionality might also be provided at the computer 414 for presenting the test data 130D to the user 420. Utilizing the test data 130D, the user 420 can make changes to the software products 112. The user 420 might then resubmit the software product 112 to the testing service 144 for continued testing in the manner described herein.

Figure 5:
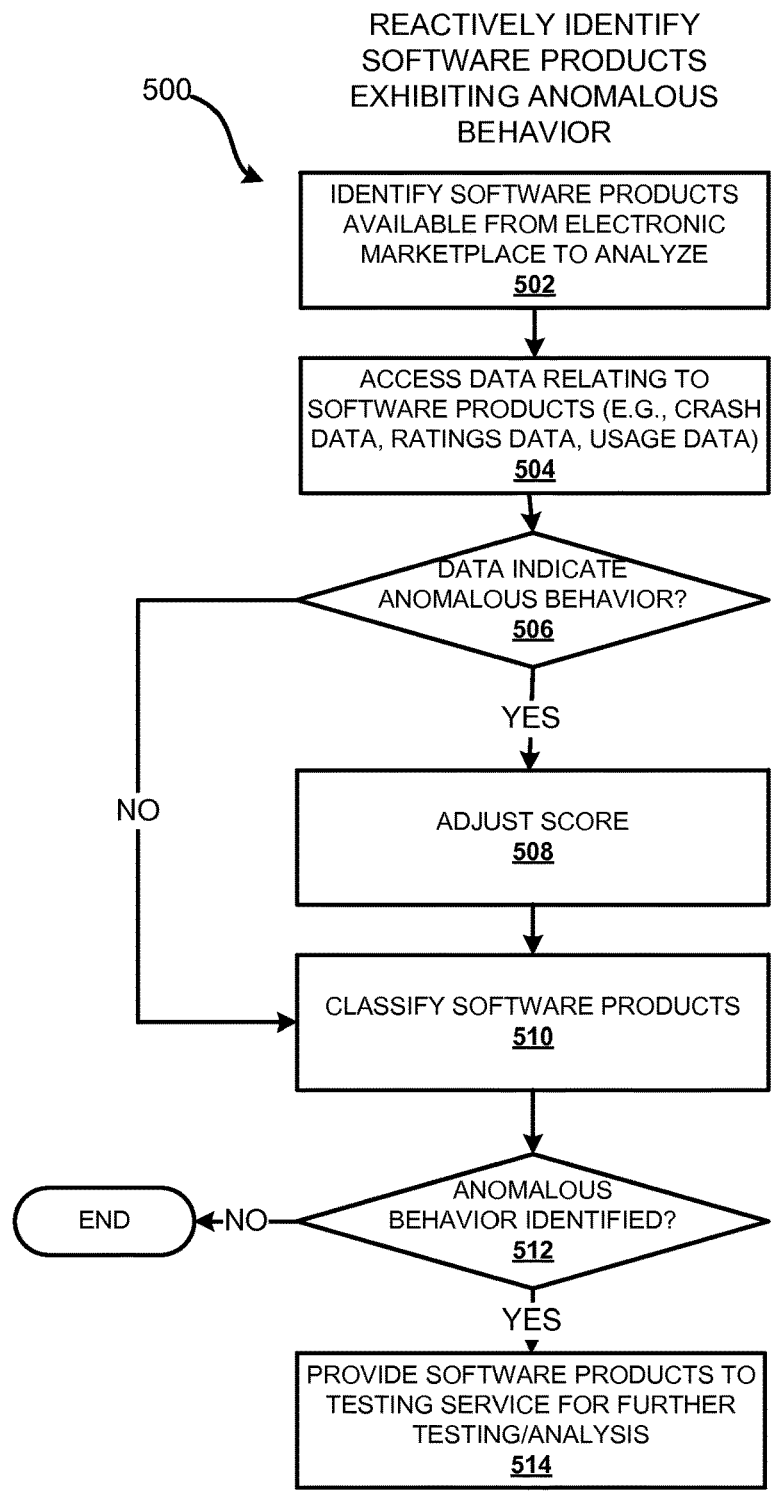
FIG. 5 is a flow diagram showing a routine illustrating aspects of a mechanism disclosed herein for reactively identifying software products that may be exhibiting anomalous behavior.

FIG. 5 is a flow diagram showing a routine 500 that illustrates aspects of reactively identifying software products 112 that exhibit anomalous behavior using software product data 130A. It should be appreciated that the logical operations described herein with respect to FIG. 5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

The routine 500 may begin at 502, where one or more software products 112 are available from the electronic marketplace 108 are identified to be analyzed. As discussed above, all or a portion of the software products 112 associated with an electronic marketplace 108 may be identified. In some examples, the software products 112 that have not been analyzed within a specified period of time are identified. In other examples, all of the software products that are part of the software product catalog 110 are identified.

At 504, data related to the identified software products 112 is accessed. As discussed above, the software product data 130A may include data such as a crash data, ratings data, usage data, marketplace data, and the like. In some examples, the software product data 130A may be stored by the electronic marketplace environment 106, the service provider network 114, and/or at some other location.

At 506, a decision is made as to whether the data indicates anomalous behavior. As discussed above, different types of data may indicate anomalous behavior. For example usage data 130E, marketplace data 130F, crash data 130G, software products ratings data 130H, software providers ratings data 130I, software product 112 uninstalls, decreased software product 112 launches, decreased session time for a software product 112, decreased software product 112 usage, decreased revenues for the software product 112, decreased repeat usage of the software product 112, decreased interactions with the software product 112 and the like might indicate anomalous behavior. When the data does indicate anomalous behavior, the routine 500 may flow to 508. When the data does not indicate anomalous behavior, the routine 500 may flow to an end operation.

At 508, a scoring mechanism, such as the scorer 134, may be used to adjust and/or generate a score for all or a portion of the identified software products 112. In some examples, a score is generated for each software product 112 that is included within a category that indicates anomalous behavior. The score may be generated in a variety of ways, but as one example a scorer 134 may determine whether the software product 112 has crashed. If so, that may increase the score by adding a predetermine number of points. Conversely, the scorer 134 may determine, for instance based on crash data, that a crash was due to a problem with the operating system or the device itself, and not the software product 112. If this is the case, the scorer may decrease the score by subtracting a number of points or determine that the software product is altogether not exhibiting anomalous behavior. In some examples, the scoring at 508 may be included within classifying the software products at 510.

At 510, the software products may be classified. As discussed above, the monitoring service 116 may use the classifier 132 to classify the software products 112 into two or more different categories using the software product data 130A. For instance, the classifier 132 might classify the software products 112 into a first category indicating anomalous behavior and into a second category indicating software products that are not exhibiting anomalous behavior.

At 512, a decision is made as to whether the software products 112 should be submitted for further analysis and/or testing based on whether anomalous behavior is identified. As discussed above, the monitoring manager 130 may determine to test or further analyze software products 112 that are included within a particular classification and/or determine to test the software products based on the score generated by the scorer 134. In some examples, the software products 112 identified as exhibiting anomalous behavior are identified to be submitted for further analysis or testing. In some configurations, the monitoring manager 130 may identify software products 112 whose score exceeds a predetermined threshold for testing and/or identify software products 112 is assigned to a classification indicating that the software products 112 are exhibiting anomalous behavior.

In some cases, the decision to test or further analyze may be based on the available resources of the testing service 144. For example, more software products 112 may be determined to be tested when there are more available resources as compared to when the testing service has fewer available resources. In other examples, the monitoring manager 130 may perform testing on some designated number or percentage of the identified software products 112. When software products are not to be tested, the routine 500 may flow to an end operation. When one or more software products 112 are to be tested, the routine 500 may flow to 514.

At 514, the software products 112 identified to be tested are submitted to the testing service 144 for further analysis and/or testing. As discussed above, the monitoring manager 130 may instruct the testing service 144 to perform testing on the software products 112 identified for testing. According to some configurations, the monitoring manager 130 may instruct the testing service 144 to perform manual analysis and/or more programmatic analysis on the identified software products 112.

Figure 6:
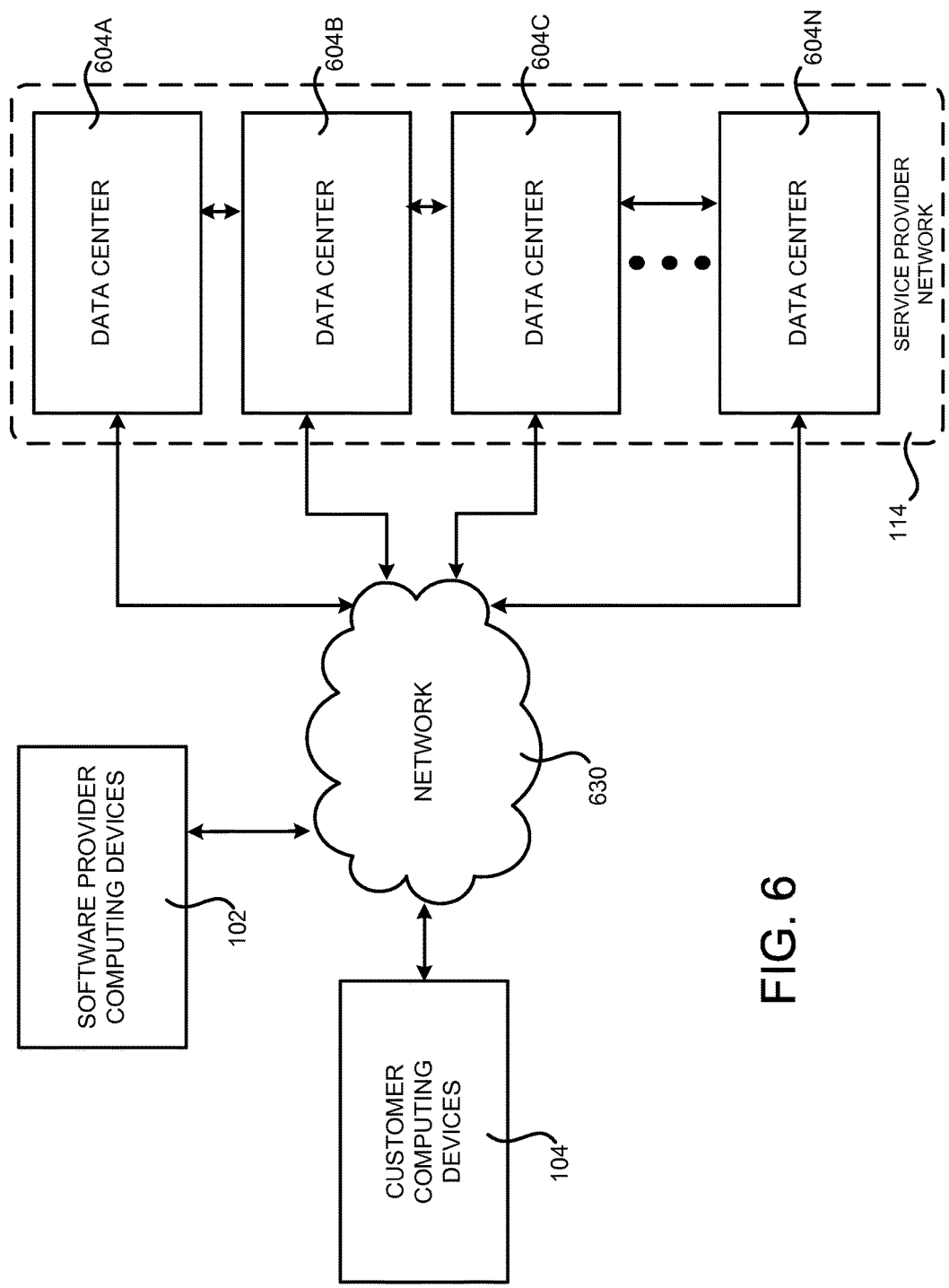
FIG. 6 is a system and network diagram that shows one illustrative operating environment for the examples disclosed herein that includes a service provider network.

FIG. 6 and the following description are intended to provide a brief, general description of a suitable computing environment in which the examples described herein may be implemented. In particular, FIG. 6 is a system and network diagram that shows an illustrative operating environment that includes a service provider network 114. As discussed above, the service provider network 114 can provide virtual machine instances and computing resources on a permanent or an as-needed basis.

The computing resources provided by the service provider network 114 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 114 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein will be described below with regard to FIG. 7.

The users and customers of the service provider network 114 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the customer computing devices 104, the software provider computing devices 102 may be utilized. It should also be appreciated that combinations of such networks might also be utilized.

Figure 7:
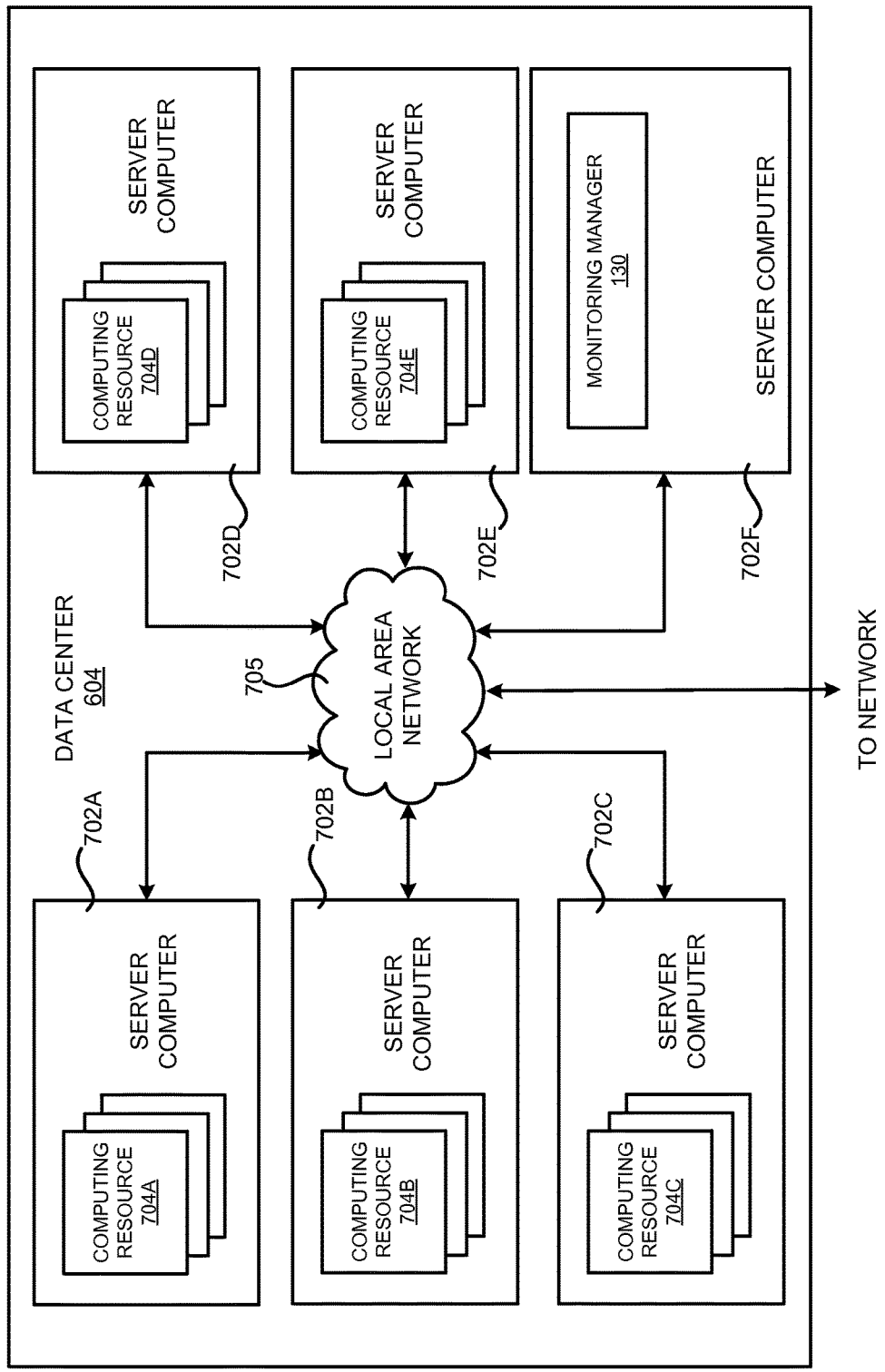
FIG. 7 is a computing system diagram that illustrates one configuration for a data center that implements aspects of a service provider network, including some or all of the concepts and technologies disclosed herein relating to reactively identifying software products may be exhibiting anomalous behavior.

FIG. 7 is a computing system diagram that illustrates one configuration for a data center 604 that implements aspects of a service provider network 114, including some or all of the concepts and technologies disclosed herein for reactively identifying software products 112 that may be exhibiting anomalous behavior. The example data center 604 shown in FIG. 7 includes several server computers 702A-702F (which may be referred to herein singularly as "a server computer 702" or in the plural as "the server computers 702") for providing computing resources. The server computers 702 may be standard tower or rack-mount server computers configured appropriately for providing the computing resources described herein. According to an example, the server computers 702 are configured to execute the software products 112 as described above.

In one example, some of the computing resources 704 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 114. The server computer 702F might also execute the monitoring manager 130 as well as other components described herein. Details regarding the operation of each of these components has been provided above. In this regard, it should be appreciated that while these components are illustrated as executing within the service provider network 114, computing systems that are external to the service provider network 114 might also be utilized to execute some or all of these components. Other configurations might also be utilized.

In the example data center 604 shown in FIG. 7, an appropriate local area network ("LAN") 705 is utilized to interconnect the server computers 702A-702E and the server computer 702F. The LAN 705 is also connected to the network 630 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 114.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
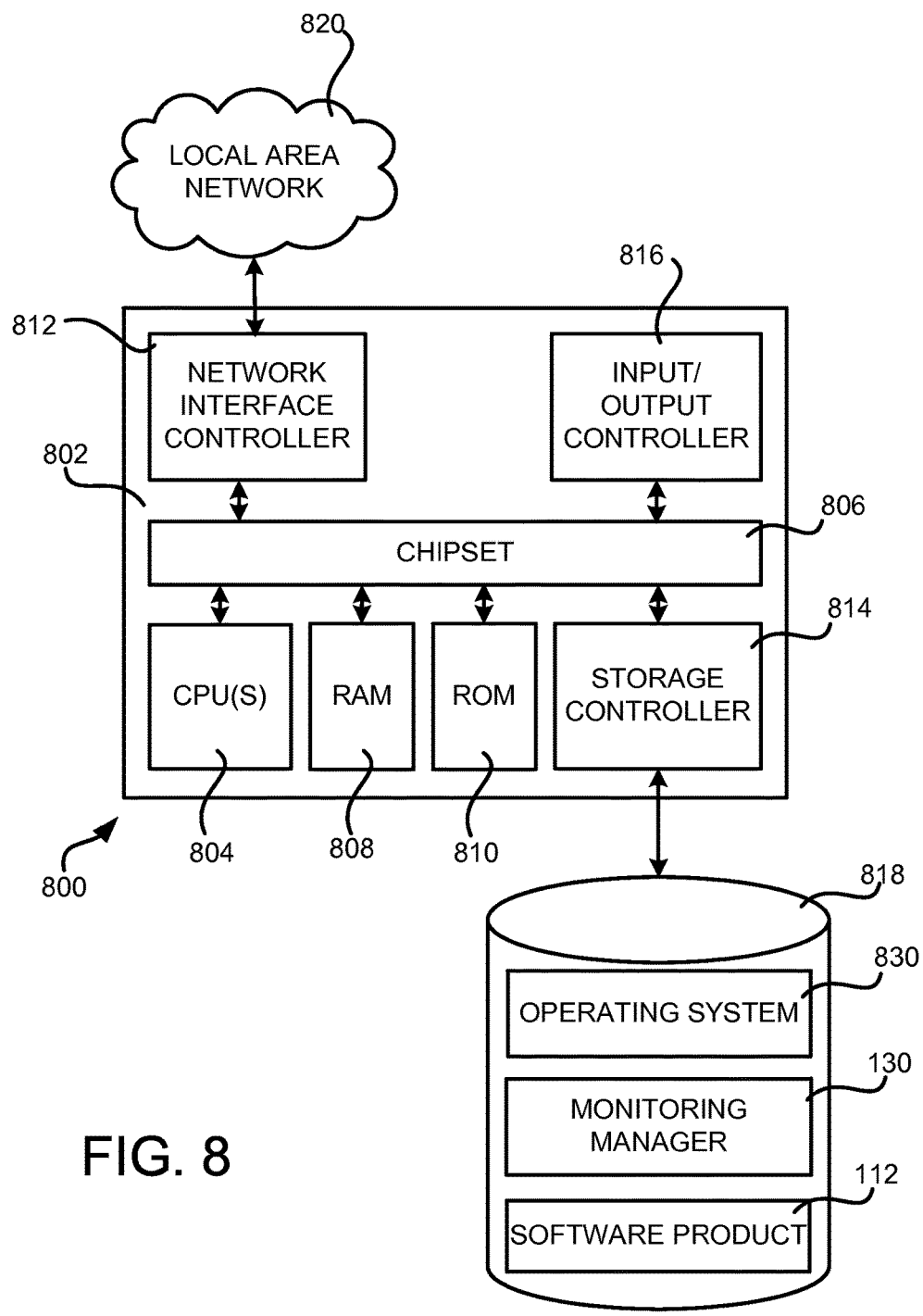
FIG. 8 is a computer architecture diagram showing one illustrative computer hardware architecture for implementing a computing device that might be utilized to implement aspects of the various examples presented herein.

FIG. 8 shows an example computer architecture for a computer 800 capable of executing program components for reactively identifying software products 112 that may be exhibiting anomalous behavior in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 104, a software provider computing device 102 or any other of the computing systems described herein.

The computer 800 includes a baseboard 802, or "motherboard," which is a printed circuit board to which a multitude of components or devices may be connected by way of a system bus or other electrical communication paths. In one illustrative example, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the examples described herein.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 818 may store other system or application programs and data utilized by the computer 800, such as components that include the monitoring manager 130, the software product 112 and/or any of the other software components and data described above. The mass storage device 818 might also store other programs and data not specifically identified herein.

In one example, the mass storage device 818 or other computer-readable storage media is encoded with computer-executable instructions that, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various routines described above with regard to FIG. 5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for reactively identifying software products 112 available from an electronic marketplace 108 exhibiting anomalous behavior have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
obtain first usage data associated with a first software product and first software product data associated with the first software product, the first software product data including at least one of:
first crash data associated with the first software product,
first product ratings data associated with the first software product,
first software provider ratings data associated with a first software provider of the first software product,
first revenue data associated with the first software product, or
first download data indicating a first amount of downloads of the first software product;
wherein the first usage data includes at least one of: a first usage time of the first software product, a first number of virtual machine instances utilized to execute the first software product, a first amount of bandwidth used by the first software product, a first frequency in which the first software product is used, and a first frequency of uninstalls of the first software product;
train a classifier to classify other software products into categories of anomalous behavior using random forests, the first usage data, and the first software product data;
assign a severity to one of the categories of anomalous behavior, wherein a linear regression mechanism indicates the severity associated with the one of the categories of anomalous behavior;
obtain second usage data associated with a second software product and second software product data associated with the second software product, the second software product data including at least one of:
second crash data associated with the second software product,
second product ratings data associated with the second software product,
second software provider ratings data associated with a second software provider of the second software product,
second revenue data associated with the second software product, or
a second download data indicating a second amount of downloads of the second software product;
wherein the second usage data includes at least one of: a second usage time of the second software product, a second number of virtual machine instances utilized to execute the second software product, a second amount of bandwidth used by the second software product, a second frequency in which the second software product is used, and a second frequency of uninstalls of the second software product;
identify that behavior of the second software product belongs to a first category of the categories of anomalous behavior using the trained classifier, the second usage data, and the second software product data based at least in part on identifying that the behavior of the second software product belongs to the first category;
remove the second software product from an electronic marketplace;
cause the second software product to be tested by a testing system; and
present, to the second software provider, a notification associated with the behavior of the second software product.

2. The non-transitory computer-readable storage medium of claim 1, wherein the computer-executable instructions further cause the computer to generate a score associated with the one of the categories of anomalous behavior.

3. The non-transitory computer-readable storage medium of claim 1, wherein the computer-executable instructions further cause the computer to provide a graphical user interface that displays data associated with the one of the categories of anomalous behavior.

4. A system, comprising:
one or more computing devices configured to:
obtain first software product data related to a first software product and first usage data associated with the first software product, the first usage data including at least one of a first usage time of the first software product, a first number of virtual machine instances utilized to execute the first software product, a first amount of bandwidth used by the first software product, a first frequency in which the first software product is used, and a first frequency of uninstalls of the first software product, and the first software product data including at least one of: first crash data associated with the first software product, first product ratings data associated with the first software product, first software provider ratings data associated with a first software provider of the first software product, first revenue data associated with the first software product, or first download data indicating a first amount of downloads of the first software product;
detect, based at least in part on the first software product data, the first usage data, and using a classifier and a machine learning model, that the first software product belongs to at least one category of anomalous behavior;
train the classifier to classify other software products from an electronic market place exhibiting the anomalous behavior into categories of the anomalous behavior using two or more of random forests, the first usage data, and the first software product data;
assign a severity to the at least one category of anomalous behavior using a linear regression mechanism;
obtain second usage data associated with a second software product and second software product data related to the second software product, the second usage data including at least one of a second usage time of the second software product, a second number of virtual machine instances utilized to execute the second software product, a second amount of bandwidth used by the second software product, a second frequency in which the second software product is used, and a second frequency of uninstalls of the second software product, and the second software product data including at least one of second crash data associated with the second software product, second product ratings data associated with the second software product, second software provider ratings data associated with a second software provider of the second software product, second revenue data associated with the second software product, or second download data indicating a second amount of downloads of the second software product;

identify that behavior of the second software product belongs to a first category of the categories of the anomalous behavior using the trained classifier, the second usage data, and the second software product data;

based at least in part on identifying that the behavior of the second software product belongs to the first category:

remove the second software product from the electronic marketplace;

cause the second software product to be tested by a testing system; and present, to a software provider of the second software product, a notification associated with the behavior of the second software product.

5. The system of claim 4, wherein the one or more computing devices are further configured to detect that the first software product belongs to the at least one category of the anomalous behavior in response to one or more-occurrences of an event or an expiration of a period of time.

6. The system of claim 4, wherein the one or more computing devices are further configured to generate a score indicating the severity of the at least one category of the anomalous behavior.

7. The system of claim 6, wherein the one or more computing devices are further configured to cause the first software product to be further analyzed based, at least in part, on the score.

8. The system of claim 4, wherein the one or more computing devices are further configured to identify the first software product from an application catalog associated with the electronic marketplace.

9. The system of claim 4, wherein the one or more computing devices are associated with the electronic marketplace.

10. The system of claim 4, wherein the electronic marketplace is associated with a service provider network.

11. The system of claim 4, wherein a monitoring system uses a multiple linear regression mechanism to indicate the severity of the at least one-category of the anomalous behavior based at least in part on the first usage data associated with the first software product, and at least two of the:

the crash data associated with the first software product,
the product ratings data associated with the first software product,
the provider ratings data associated with the first software provider of the first software product, or
marketplace data associated with the first software product.

12. The system of claim 4, wherein the one or more computing devices are further configured to tune the machine learning model using a datum from the testing system.

13. The system of claim 4, wherein the one or more computing devices are further configured to provide a graphical user interface that displays data associated with the at least one category of the anomalous behavior.

14. A computer-implemented method to identify potentially problematic software products for further testing, the method comprising:

obtaining first software product data related to a first software product available from an electronic marketplace and first usage data associated with the first software product, the first usage data including at least one of a first usage time of the first software product, a first number of virtual machine instances utilized to execute the first software product, a first amount of bandwidth used by the first software product, a first frequency in which the first software product is used, and a first frequency of uninstalls of the first software product, the first software product data including at least one of first crash data associated with the first software product, first product ratings data associated with the first software product, first software provider ratings data associated with a first software provider of the first software product, first revenue data associated with the first software product, or first download data indicating a first amount of downloads of the first software product;

classifying, using a linear regression mechanism, the first software product into at least one category of anomalous behavior based at least in part on the first software product data, the first usage data, and a severity of the anomalous behavior:

train a classifier to classify other software products from an electronic market place exhibiting the anomalous behavior into categories of the anomalous behavior using two or more of random forests, the first usage data, and the first software product data;

obtain second usage data associated with a second software product and second software product data related to the second software product, the second usage data including at least one of a second usage time of the second software product, a second number of virtual machine instances utilized to execute the second software product, a second amount of bandwidth used by the second software product, a second frequency in which the second software product is used, and a second frequency of uninstalls of the second software product, and the second software product data including at least one of second crash data associated with the second software product, second product ratings data associated with the second software product, second software provider ratings data associated with a second software provider of the second software product, second revenue data associated with the second software product, or second download data indicating a second amount of downloads of the second software product;

identify that behavior of the second software product belongs to a first category or a second category of the anomalous behavior using the trained classifier, the second usage data, and the second software product data; and based at least in part on identifying that the behavior of the second software product belongs to the first category or the second category:

remove the second software product from the electronic marketplace;

causing the second software product to be tested by a testing system; and present, to a software provider of the second software product, a notification associated with the behavior of the second software product.

15. The computer-implemented method of claim 14, further comprising generating a score for the first software product, the score providing an indication that the first software product is to be further analyzed.

16. The computer-implemented method of claim 14, wherein the severity of the anomalous behavior is determined, at least in part, using a statistical mechanism.

17. The computer-implemented method of claim 14, further comprising providing a graphical user interface that displays data associated with the at least one category of the anomalous behavior.

* * * * *